US 10,443,273 B2

United States Patent
Harring et al.

(10) Patent No.: US 10,443,273 B2
(45) Date of Patent: Oct. 15, 2019

(54) PROTECTIVE CASE

(71) Applicant: LEICA GEOSYSTEMS AG, Heerbrugg (CH)

(72) Inventors: Thomas Harring, Baar (CH); Katherine Broder, Ruggell (LI); Burkhard Böckem, Jonen (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 15/779,058

(22) PCT Filed: Nov. 23, 2016

(86) PCT No.: PCT/EP2016/078584
§ 371 (c)(1),
(2) Date: May 24, 2018

(87) PCT Pub. No.: WO2017/089416
PCT Pub. Date: Jun. 1, 2017

(65) Prior Publication Data
US 2018/0355638 A1    Dec. 13, 2018

(30) Foreign Application Priority Data
Nov. 24, 2015 (EP) .................................... 15196101

(51) Int. Cl.
*E05B 73/00* (2006.01)
*G06F 21/88* (2013.01)
(Continued)

(52) U.S. Cl.
CPC .......... *E05B 73/0082* (2013.01); *A45C 11/00* (2013.01); *A45C 11/38* (2013.01);
(Continued)

(58) Field of Classification Search
CPC .... E05B 73/0082; H04W 4/029; G01C 15/00; G06F 21/88
(Continued)

(56) References Cited

U.S. PATENT DOCUMENTS

| 6,561,328 | B1 | 5/2003 | Huang |
| 8,954,016 | B2 * | 2/2015 | Seiler ...................... H04Q 9/00 340/853.2 |

(Continued)

FOREIGN PATENT DOCUMENTS

| DE | 202 04 826 U1 | 6/2002 |
| EP | 2 737 820 A1 | 6/2014 |

(Continued)

OTHER PUBLICATIONS

European Search Report dated May 20, 2016 as received in Application No. 15196101.

*Primary Examiner* — John A Tweel, Jr.
(74) *Attorney, Agent, or Firm* — Maschoff Brennan (57) ABSTRACT

A portable protective case for the safe transport and storage of measuring devices and other electrical equipment. The protective case is designed to protect a valuable and sensitive measuring device located inside it against theft, unauthorized use and/or potentially harmful environmental influences. The case comprises communication means for sending and receiving data via a wireless network, as well as for receiving localization data, which enable the communication unit to provide at least a rough location of the case.

19 Claims, 5 Drawing Sheets

(51) Int. Cl.
  *H04W 4/029* (2018.01)
  *A45C 11/00* (2006.01)
  *A45C 13/18* (2006.01)
  *G01C 15/00* (2006.01)
  *G01S 19/16* (2010.01)
  *G12B 9/00* (2006.01)
  *H04W 12/12* (2009.01)
  *A45C 11/38* (2006.01)
  *G12B 9/08* (2006.01)
  *A45C 13/02* (2006.01)
  *H04W 4/80* (2018.01)

(52) U.S. Cl.
  CPC .......... *A45C 13/18* (2013.01); *E05B 73/0023* (2013.01); *G01C 15/00* (2013.01); *G01S 19/16* (2013.01); *G06F 21/88* (2013.01); *G12B 9/00* (2013.01); *G12B 9/08* (2013.01); *H04W 4/029* (2018.02); *H04W 12/12* (2013.01); *H04W 12/1206* (2019.01); *A45C 2013/026* (2013.01); *G06F 2221/2101* (2013.01); *G06F 2221/2115* (2013.01); *H04W 4/80* (2018.02)

(58) Field of Classification Search
  USPC ....................................................... 340/568.1
  See application file for complete search history.

(56) References Cited

U.S. PATENT DOCUMENTS

| | | | |
|---|---|---|---|
| 9,721,305 B2* | 8/2017 | Bomze | ................. H04W 4/029 |
| 2008/0116093 A1 | 5/2008 | Felten et al. | |
| 2012/0279875 A1 | 11/2012 | Simpson | |
| 2013/0109375 A1 | 5/2013 | Zeiler et al. | |

FOREIGN PATENT DOCUMENTS

| | | |
|---|---|---|
| GB | 2 180 220 A | 3/1987 |
| JP | 2005-320695 A | 11/2005 |

* cited by examiner

PROTECTIVE CASE

FIELD OF THE INVENTION

The present invention relates to a portable protective case, in particular, designed as a case for the safe transport and storage of measuring devices and other electrical equipment. In particular, the protective case according to the invention is designed to protect a valuable and sensitive measuring device located inside it against theft, unauthorized use and/or potentially harmful environmental influences.

BACKGROUND

Methods and systems for distance measuring are used in various fields of application. Examples of this are extremely precise measurements in geodetic applications, but also measuring tasks in the field of building installation or for industrial process control systems. For these tasks either stationary, portable or hand-held distance measuring devices are used, which perform an optical distance measurement at a selected measuring point. A measuring device in the following will be understood to cover electronic instruments, which are used in the context of the geodetic, industrial or construction-related measurement. This comprises, for example, devices for optical distance measurement or the acquisition of three-dimensional coordinates of remote objects, such as theodolites, tachymeters, total stations, laser trackers, laser scanners or hand-held distance measuring devices, but also other tools such as rotational lasers, pipe lasers or line lasers, or GNSS receiver units.

Such devices, in particular high-precision devices intended for professional applications, are both relatively expensive to procure and sensitive to harmful environmental conditions, such as humidity or extreme temperatures, and also to vibrations and impacts during transport. It is therefore desirable, to protect valuable measuring devices effectively against unauthorized use, theft and damage.

Furthermore, it is desirable that these devices are used as efficiently as possible. This means that in particular, unnecessary waiting times at the location of use of the device should be avoided—e.g. such times in which the equipment must first be configured before use, when usage-related or location-related data are loaded into the device, or when the device is being brought up to operating temperature.

SUMMARY

An object of some embodiments of the present invention is therefore to provide an improved protective case for measuring equipment.

A further object of some embodiments is to provide such a protective case, which enables at least a rough positioning of the case.

A further object of some embodiments is to provide such a protective case and a method which prevent unauthorized use of the measuring device located therein, or render it more difficult.

A further object of some embodiments is to provide such a protective case and a method which enable a measuring device located in the protective case to be prepared for use.

A further object of some embodiments is to provide such a protective case and/or a system consisting of a plurality of such protective cases, which facilitates a completeness check of the measuring equipment to be transported.

At least one of these objects is achieved by the implementation of the characterizing features of the independent claims. Advantageous configurations of the invention can be found in the respective dependent claims.

A first aspect of some embodiments of the present invention relates to a portable protective case for a measuring device (in short: protective case) for transporting an electrical measuring device. This case has an outer shell with inner casing that encloses an interior space, which is designed to accommodate the measuring device, wherein the interior space has at least one mounting and wherein the at least one mounting is specially designed to accommodate a specific type of measuring device with known dimensions. In addition, the protective case has a handle which is designed to enable the protective case to be carried by a user, a locking mechanism, which is designed to enable the protective case to be opened by a user, a communication unit integrated in the protective case, in particular in the shell or the cladding, and a power supply unit having at least one rechargeable battery for supplying power to the communication unit.

According to some embodiments of the invention, the protective case has verification means for verifying a presence and an identity of a measuring device in the interior space. The communication unit is designed to retrieve data about the presence and identity of the measuring device, to retrieve and send data over an external wireless network, in particular over a terrestrial or satellite-based mobile wireless network or a local area network, and to receive localization data that represent at least a rough position of the protective case.

In one embodiment the protective case according to the invention is designed to accommodate a specific measuring device or a specific type of measuring device with known dimensions. Such a measuring device can be designed in particular as one of the following:
a theodolite,
a total station,
a laser tracker,
a laser scanner,
a rotating laser,
a digital spirit level,
a portable distance measuring device,
a detection device,
a line laser or
a GNSS receiver unit.

Optionally, the protective case can have rollers or wheels that are designed to enable the case to be moved by a single user by pushing or pulling.

In particular the interior space can be filled with a carrier material, for example a foam or a plastic molding manufactured by blow molding, wherein the at least one mounting is a recess in the carrier material with a shape corresponding to the device.

To accommodate components of a disassembled measuring device the interior space can optionally have a plurality of correspondingly designed mountings. Likewise, the interior space can additionally have at least one mounting designed for holding a replacement part or accessory of the measuring device.

According to a further embodiment, the verification means comprise a camera, a proximity sensor, a barcode scanner or an RFID reader, in order to verify the presence of a measuring device to be accommodated (and/or the completeness of all parts to be accommodated) in the interior space and/or to determine the identity of the measuring device.

According to a further embodiment, the protective case according to the invention has means for generating a wireless data network in the interior space, for example using Bluetooth or a WLAN signal.

The communication unit is designed to exchange data with the measuring device, e.g. over this wireless data network, in particular wherein the communication unit is designed to forward data retrieved via the wireless network to the measuring device and/or to send data received by the measuring device.

According to a further embodiment the protective case according to the invention has a display unit on its outer shell for displaying information about a measuring device located in the interior space, in particular in the form of a touch-screen or an e-paper display, in particular wherein the communication unit is designed to supply the information about the measuring device located in the interior space to the display unit.

In one embodiment the power supply unit is additionally designed also to supply power to the measuring device in the interior space by means of a cable, by means of electrical contacts or by means of induction.

In particular, this supply unit has a rechargeable battery, a current generator, a fuel cell, solar cells, or means for supplying external power (e.g. a connector for a power cable, induction coils or electrical contacts).

The protective case can also have means for displaying a charge state of the device, or the communication unit can be designed for sending information regarding the charge state of the measuring device, and/or the supply unit.

Optionally, the supply unit can additionally initiate the charging of the internal accumulator of the measuring device to prepare the device for the next use. Devices that could be used for charging are, for example, a rechargeable battery of the supply unit (as an emergency buffer), a spare rechargeable battery of the measuring device located in the case, which is connected to the case electronics, or an external power source, such as a vehicle on-board power supply.

If it is detected that the (total) charge state is at a critical level with due consideration of the planned usage, a warning can be output to the user. After use, the case can indicate the charge state and/or require connection to an external power source.

In accordance with another embodiment the communication unit is designed to set up a connection to the internet, and to retrieve and send data over the internet.

In one embodiment, the communication unit can set up a connection to a communication unit of at least one other protective case for the exchange of data.

In one embodiment, for the exchange of data the communication unit can set up a connection to another measuring device, which does not have its own protective case with a communication unit.

In accordance with another embodiment, the communication unit is designed to set up a connection to a means of transport, in particular a vehicle, that accommodates the protective case. For example, data of a navigation system of the vehicle can be accessible, or a local area network (e.g. WLAN or Bluetooth) of the vehicle can be used for communication via the internet.

According to a further embodiment the communication unit is designed to retrieve and/or to send the data automatically, in particular from or to an external server computer.

According to a further embodiment the communication unit is designed to retrieve the localization data over the wireless network.

According to a further embodiment, the protective case has a GNSS receiver unit for determining the position of the case by means of a global satellite navigation system, wherein the communication unit is designed to receive the localization data from the GNSS receiver unit.

In one embodiment of the case according to the invention, the communication unit is designed to determine at least a rough position of the protective case, based on the retrieved data. The position of the case can be determined in particular to an accuracy of at least three hundred meters, preferably to an accuracy of at least thirty meters. Optionally, the communication unit can be designed to create a movement profile based on a plurality of derived positions of the protective case.

In a further embodiment of the protective case according to the invention, the communication unit is designed, based on the identified position of the protective case and a known usage location of the measuring device, to determine, i.e. in particular, to calculate or estimate, a time remaining for the case to arrive at the usage location. The communication unit can preferably retrieve such data, from which the usage location can be determined.

The communication unit can also be designed to exchange data with the measuring device and based on a calculated time remaining, to automatically switch on the measuring device and/or to transmit usage location-related data to the measuring device.

In a further embodiment, in order to control a temperature of the interior space and/or of the measuring device, the protective case according to the invention has a temperature regulating unit with a temperature sensing unit and a heating and/or cooling function. The communication unit in this embodiment is designed to send a command to the temperature regulating unit based on a calculated time remaining, for the temperature of the interior space and/or of the measuring device to approach or to match an optimum operating temperature of the measuring device.

Optionally, the protective case has a drying functionality for drying a measuring device which is wet when inserted.

According to a further embodiment the communication unit of the case is designed to send a command to the locking mechanism of the case, based on a calculated position of the case. The locking mechanism in accordance with this embodiment is designed to prevent the protective case from being opened or allow it to be opened by a user in the intended manner, and/or to open the protective case automatically, depending on the command received by the communications unit. If opening is prevented, for example, a code entry by the user may be necessary in order to open the case, or transport it to another location.

In one embodiment the communication unit of the case is designed to send a command to a measuring device located in the interior space, in order to activate (or deactivate a previously set locking mode), in which essential functions of the measuring device are not available, in particular until the measuring device is enabled by means of an unlocking code.

According to a further embodiment of the protective case according to the invention, data can be retrieved by the communication unit, from which the existence or non-existence of a usage authorization for the measuring device can be determined and the communication unit is designed to determine, based on the data, the existence or non-existence of a usage authorization of the measuring device. These data can in particular be retrieved from an external server over the internet.

The protective case can optionally have means that are designed to detect an attempt at opening the locking mechanism and to report it to the communication unit.

In a further embodiment, the protective case has an automatically running anti-theft functionality, as part of which the communication unit—in particular if a non-existence of a usage authorization for the measuring device has been determined—is designed

- to transmit a position of the case to an external server;
- to send a command to a measuring device located in the interior space in order to activate (or deactivate a pre-configured locking mode), in which at least essential functions of the measuring device are not available, in particular until the measuring device is enabled by means of an unlocking code;
- to send a command to the locking mechanism, and the locking mechanism is designed to prevent opening of the protective case by a user in the intended manner, depending on the command received by the communication unit;
- to send a command to an alarm unit of the case, and the alarm unit is designed to emit a visual and/or audible warning signal, depending on the command received by the communication unit;
- to send a command to a self-destruction unit of the case, and the self-destruction unit is designed to destroy or render a measuring device, or essential parts of the same located in the interior space permanently unusable, depending on the command received by the communication unit, and/or
- to send a command to a marking unit of the case, and the marking unit is designed to visually mark (e.g. as stolen) a measuring device located in the interior space, depending on the command received by the communication unit.

The protective case can contain resources that are designed to detect an improper, in particular violent, opening of the case (such as breaking open the locking mechanism or the outer shell).

Alternatively, in the event of a usage authorization based on time-related, location-related, usage-related or personal information, a command can also be sent to a measuring device located in the interior space (for example, license codes received from a server) to enable one or more functions. Otherwise, the measuring device remains locked or only partially functional.

In a further embodiment the protective case is equipped with additional sensors for capturing and recording environmental factors, such as humidity, temperature, vibration and shocks, which the communication unit supplies on a regular basis or on request, or sends to a central server. This may, in particular, be used to determine improper transport and storage conditions, to warn of potential impairments of the functional state (calibration), or to use the information obtained in the assessment of warranty cases.

A second aspect of some embodiments of the present invention relate to a system of at least two protective cases according to the invention. In the protective cases of the system according to the invention, each communication unit is designed to set up a connection to communication units of other protective cases and to exchange data, which at least contain information about measuring devices located in the interior space of the protective case. These data include, for example, at least information about the presence and/or completeness and an identity of the measuring devices. The data are exchangeable in particular by means of a WPAN or WLAN connection. Preferably, at least one first communication unit can be designed to forward data retrieved via the wireless network to other communication units, and to send data received from other communication units via the wireless network.

A third aspect of some embodiments of the present invention relate to a method for preparing a measuring device for use at a known location during transport of the measuring device in an interior space of a case. In this case the case is a measuring device protective case according to the first aspect of the invention. The method comprises

- a retrieval of localization data that provide at least a rough localizability,
- a calculation of at least a rough position of the measuring device based on the localization data, and
- a calculation of a time remaining until arrival at the usage location, based on the identified position and the known usage location.

At the same time, based on the calculated time remaining, the measuring device is switched on, in particular wherein usage location-related data are transmitted to the measuring device. As an alternative, based on the identified remaining time, a rechargeable battery of the measuring device is charged. Alternatively or in addition, based on the calculated time remaining, a temperature of the interior space and/or of the measuring device is approximated or matched to an optimal operating temperature of the measuring device.

A fourth aspect of some embodiments of the present invention relate to a method for preventing unauthorized use of a measuring device located in a case, in particular a portable protective case according to the first aspect of the invention. The method comprises retrieval of data via a wireless network and determination based on the data whether a location-related, time-related or individual-related authorization exists for the measuring device. If this authorization does not exist, the protective case is prevented from opening in the intended manner and/or essential functions of the measuring device are disabled, wherein these are not available, for example, until they are enabled by means of an unlocking code.

In one embodiment this method has an automatically running anti-theft functionality, as part of which

- a position is determined based on the data and the position is sent to an external server;
- a visual and/or audible warning signal is emitted;
- the measuring device is visually marked; and/or
- the measuring device is rendered unusable, in particular by the fact that essential functions of the measuring device are disabled, wherein these are not available in particular until they are enabled by means of an unlocking code, or are permanently destroyed.

Optionally, an improper, in particular violent, opening of the case can be detectable, wherein the anti-theft functionality is triggered automatically upon detection of an improper opening of the case.

A further aspect of some embodiments of the present invention relate to a portable protective case for the transport of an electrical device, wherein the protective case has an outer shell with internal cladding that encloses an interior space which is designed to accommodate the device, wherein the interior space has at least one mounting and wherein the at least one mounting is specially designed to accommodate a specific type of measuring device with known dimensions. The protective case has a communication unit, integrated in particular in the shell or the cladding of the protective case, and a power supply unit for supplying power to the communication unit. According to the invention, means are provided for generating a wireless data network in the interior space, and verification means for verifying a presence of the device in the interior space and/or an identity of the device, which are designed to send data about the presence and/or identity of the device to the communication unit, and a display unit for displaying information about a device located in the interior space on the outer shell are provided, wherein the communication unit is designed to exchange data with the device located in the interior space via the wireless data network and to supply the information about the device to the display unit.

In particular, the device can be designed as an electrical measuring device, e.g. as
- a theodolite,
- a tachymeter,
- a total station,
- a laser tracker,
- a laser scanner or
- a hand-held distance measuring device.

The device that is transported can also in particular be any other device used in geodetic, industrial or surveying applications, in particular a rotating laser, a pipe laser or a line laser.

In one embodiment of the protective case the wireless data network is generated using Bluetooth or a WLAN signal.

According to a further embodiment, the protective case has a human-machine interface on its outer shell, in particular wherein the display unit and the interface are implemented as a touch-screen.

According to a further embodiment the display unit is designed in the form of an e-paper display.

A further embodiment of the protective case is characterized in that the information about the device located in the interior space comprises at least the following:
- a state of charge of a battery of the device,
- a configuration of the device, or
- information about a rental agreement of the device, in particular about a hirer, owner and/or return date.

In one embodiment of the protective case, the verification means comprise at least one camera, a proximity sensor, a barcode scanner or an RFID reader.

According to a further embodiment the verification means are designed to verify the presence and/or the identity of the device by means of the wireless data network.

According to a further embodiment the communication unit is designed
- to retrieve and send data over a wireless network, in particular over a terrestrial or satellite-based mobile wireless network or a local area network, and
- to forward data retrieved over the wireless network to the device and/or to send data received from the device.

According to a further embodiment the communication unit is designed
- to maintain a connection to at least one device, which is not located in the interior space of the protective case;
- to maintain a connection to a communication unit of at least one other protective case; and/or
- to maintain a connection to a means of transport, in particular a vehicle, that accommodates the protective case.

According to a further embodiment, the communication unit is designed to receive localization data that represent at least a rough position of the protective case. In particular, the communication unit is designed to retrieve the localization data over the wireless network or using GNSS, and/or to create a motion profile based on a plurality of derived positions of the protective case. In particular, the position of the protective case can be determined to an accuracy of at least three hundred meters, preferably to an accuracy of at least thirty meters.

According to a further embodiment the power supply unit is additionally designed to supply power to the device in the interior space by means of a cable, by means of electrical contacts or by means of induction.

According to a further embodiment, the power supply unit has at least one rechargeable battery, a current generator, a fuel cell, solar cells or means for supplying external power, in particular a connector for a power cable, induction coils or electrical contacts.

According to a further embodiment, the protective case has a handle, which is designed to enable the protective case to be carried by a user, and/or a locking mechanism, which is designed to enable the protective case to be opened by a user in the intended manner.

According to a further embodiment of the protective case, the interior space is filled with a carrier material, in particular a foam or a plastic molding manufactured by blow molding, and the at least one mounting is a recess in the carrier material with a shape corresponding to the device.

According to a further embodiment of the protective case, the at least one mounting is designed for accommodating components of a disassembled unit and/or a replacement part or accessory of the device.

BRIEF DESCRIPTION OF THE DRAWINGS

The measuring device protective case according to the invention and the protection methods are described below on the basis of specific exemplary embodiments shown schematically in the drawings purely as examples, wherein further advantages of the invention will also be discussed. Individually, they show.

DETAILED DESCRIPTION

Figure 1:
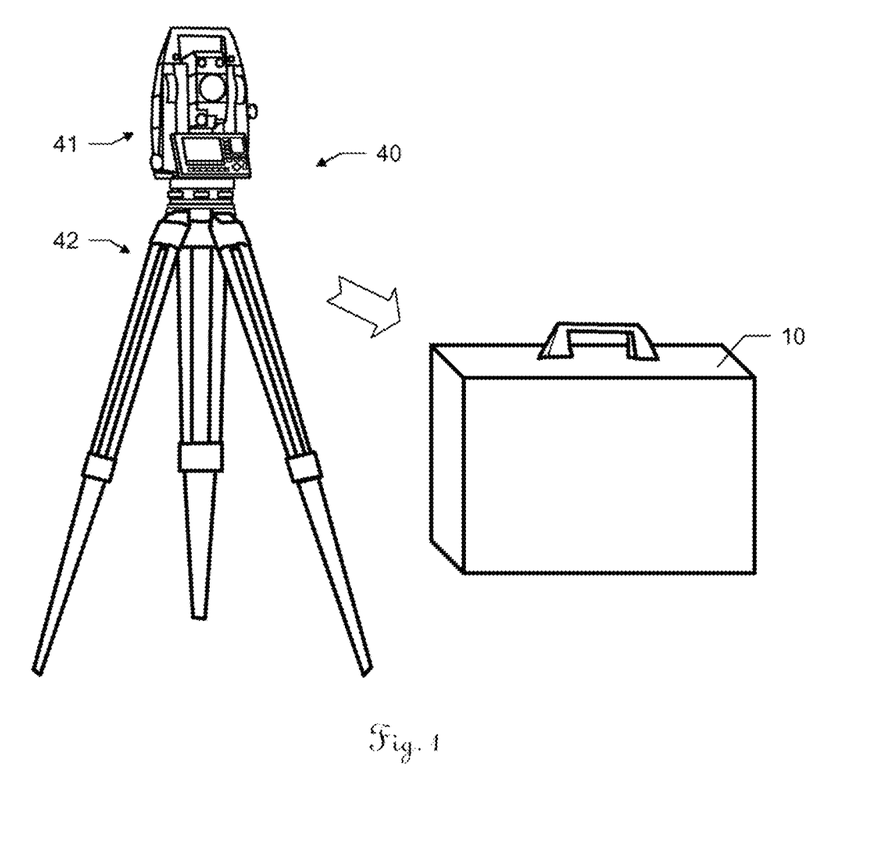
FIG. 1 a total station as an example of a measuring device which is transportable in a protective case according to the invention.

FIG. 1 shows a suitcase 10 as a protective case according to the invention for transporting a measuring device. The measuring device to be transported is shown here as a total station 40, purely as an example. This can be decomposed into an upper part 41 and a tripod unit 42.

Figure 2A:
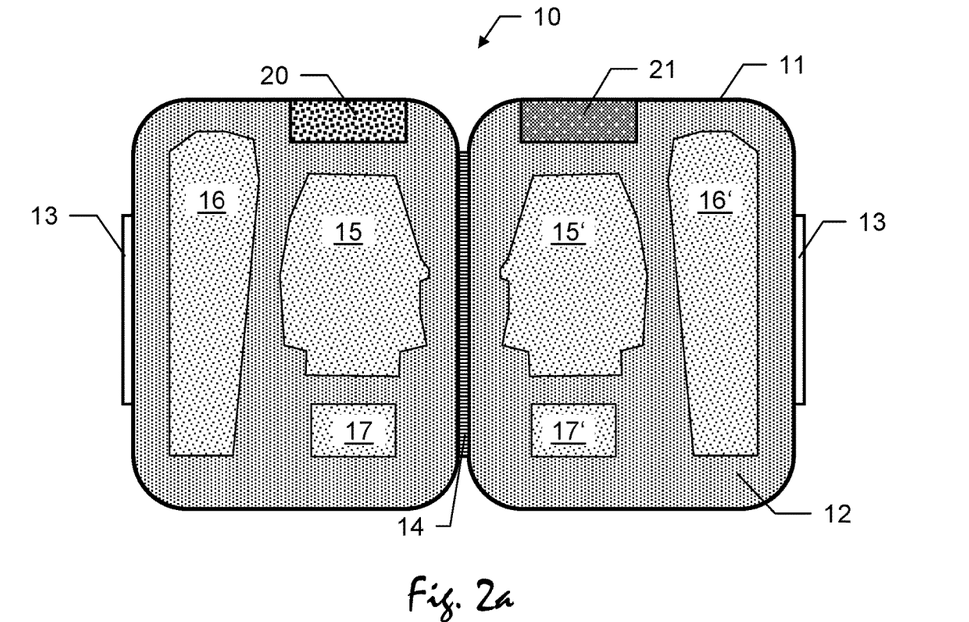
FIG. 2a-b an exemplary embodiment of a protective case according to the invention in the open state for receiving the total station of FIG. 1.
Figure 2B:
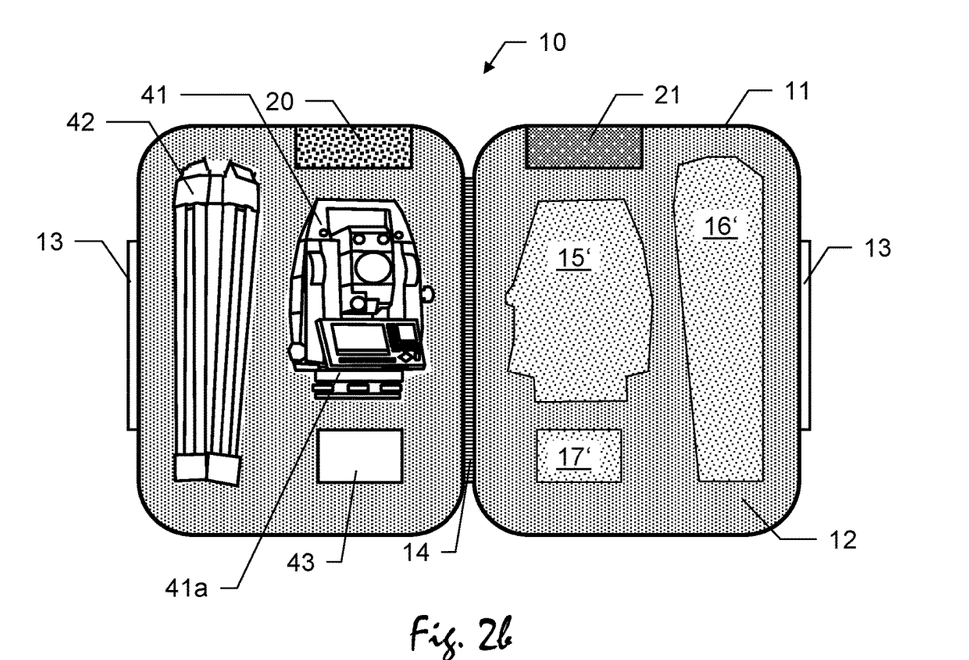

FIGS. 2a and 2b show an exemplary embodiment of the protective case designed as a suitcase 10. FIG. 2a shows an unfolded empty suitcase 10, and FIG. 2b shows the same case with components and accessories of a total station 41-43, including a display unit 41a, inserted.

The protective case 10 according to the invention has a locking mechanism 13, by means of which the protective case can be closed. For example, the locking mechanism 13 can be to open and close by means of keys, or have a mechanical or electronic combination lock or else a fingerprint scanner. But other types of locking mechanism are also possible in general. According to the invention, the case 10 also has a communication unit 20, which is designed for establishing a communication connection via a wireless network. To this end the communication unit 20 has, for example, a SIM card and a mobile wireless antenna. Alternatively or additionally, a connection can be established using a local area network, such as WLAN. Optionally, the communication unit 20 can additionally have a GNSS receiver unit for determining the position of the case using a global satellite navigation system (e.g. GPS).

As shown in FIG. 2a purely as an example, the protective case 10 can be designed as a suitcase, whose two halves can be folded out by means of a hinge 14 to open the suitcase. The suitcase has a shell 11, which is preferably robust and water-resistant and which completely encloses an interior space 12 of the suitcase.

In the interior space 12, mountings are provided for accommodating the measuring device and/or its components and accessories and/or spare parts and preferably fixing them in place. In the example shown here, these mountings are embodied as recesses 15-17, 15'-17' in a soft but dimensionally stable foam, which substantially fills the entire interior space 12. Alternatively, the interior space can also be given an appropriate shape by blow molding (e.g. extrusion or stretch blow molding).

The recesses 15-17, 15'-17' are located in both halves of the suitcase and are shaped to correspond to the components and parts of the measuring device to be transported. In addition, the suitcase has a battery or a rechargeable battery 21 for supplying power to the communication unit 20. The communication unit 20 is fitted in the interior space 12 in such a way and the sleeve 11 is designed in such a way as to enable a communication of the communication unit 20 via an external wireless network. In particular, it is possible to integrate an antenna of the communication unit 20 into the shell 11 for this purpose.

In FIG. 2b an upper part 41 and a tripod unit 42 of the total station 40 of FIG. 1 are inserted into two of the recesses 15, 16 of the first half of the suitcase. The third recess 17 has accommodated a rechargeable battery 43 as an accessory of the total station. The recesses 15'-17' of the second half of the suitcase accommodate the protruding parts of the total station components 41-43 when closing the case 10.

In order to extend the lifetime of the rechargeable battery 43, different means of energy harvesting are preferably available. Also, the communication unit can have energy-saving operating modes, such as a periodic operation with regular inactivity phases (sleep cycles).

Preferably, the case can have a connector for an external power supply (not shown here). This can be either a simple connector for a power cable, or else specially designed contacts or induction coils, which also have specially designed counterparts, which make the charging process particularly easy for a user. These pieces can be fitted in a vehicle, for example, which is transporting the cases or be part of the shelves in which the cases are stored when they are not needed, so that the devices are always ready for use without the need to remove from the case.

The rechargeable battery 43 can also be used for supplying power to the transported measuring device 40. In particular, the battery of the device can be charged during transport. For this purpose, the case can have means for supplying power to the measuring device 40 in the interior space. These can include a suitable cable that is plugged into the measuring device 40 by the user, or electrical contacts located in the corresponding recesses, which during the insertion of the device 40 automatically come into contact with corresponding contacts of the device 40, so that a current can flow. In the same way an induction coil can be provided, by means of which electrical energy can be transferred into a measuring device placed in the protective case.

Figures 3, 4:
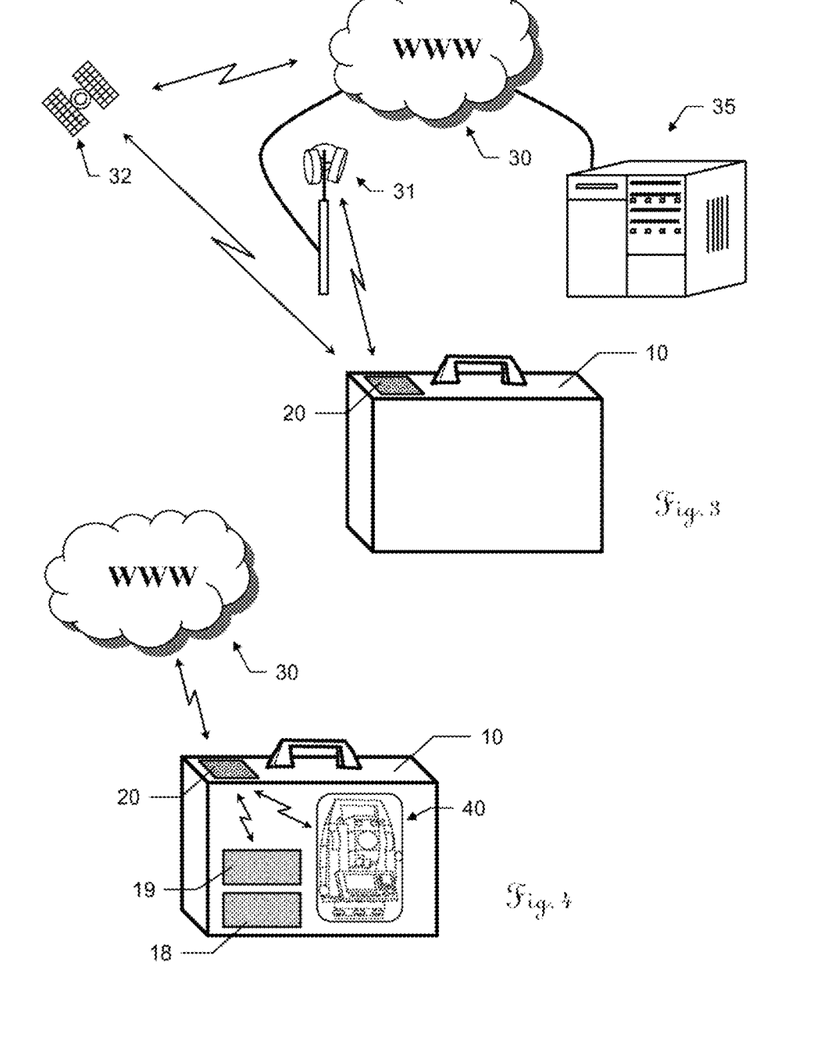
FIG. 3 a communication of a communication unit of the protective case with an external server over the internet.
FIG. 4 a communication of the communication unit with other components of the protective case and with the transported measuring device.

FIG. 3 illustrates an example of communication of the communication unit 20 of the protective case 10 via the external wireless network. In the example shown this is a mobile wireless network, and the communication unit 20 has a SIM card in order to be able to exchange data over the wireless network. Via mobile phone masts 31 a connection can be established to a terrestrial mobile wireless network, or via satellites 32 to a satellite-based network. In particular, data can be exchanged with an external server computer 35 over the internet 30. Due to the connection to the wireless network a rough real-time localization of the case is possible, for example via GSM positioning.

FIG. 4 illustrates an example of an internal communication of the communication unit 20 of the protective case 10. In addition to the external communication facility illustrated in FIG. 3 the communication unit 20 can preferably also have an internal communication facility. Thus, the communication unit 20 can communicate on the one hand with other units of the protective case 10 and on the other, via an internal radio network—for example via WLAN or Bluetooth—with a measuring device 40 which is transported in the interior space of the case.

Examples of other units of the protective case 10 shown here are a temperature regulating unit 18 and an alarm unit 19.

The temperature regulating unit 18 has on the one hand, a temperature sensor, which is designed to detect a temperature of the interior space 12; preferably it can be mounted in such a way that it can detect a temperature of the measuring device 40. Optionally, a second temperature sensor can detect an outside temperature. On the other hand, the temperature regulating unit 18 has a heating and/or cooling function in order to increase or decrease the temperature of the interior space 12 or the measuring device 40. For example, the temperature can be kept in a certain range during the entire transport, in order to prevent damage to the measuring device 40, or the measuring device 40 can already be set to an optimal operating temperature before use, in order to reduce wear and/or maintenance times.

Alternatively or in addition to this temperature regulating unit 18, a drying unit can also be provided, which can dry a wet measuring device which is packed in the protective case after use (e.g. after use in wet weather). For this purpose, the drying unit can be designed, for example, as part of the temperature regulating unit 18, and by means of a heating function and ventilation can discharge the moisture from the interior space of the case to the environment. As an alternative, other drying options can be considered, such as condensation drying or granulate drying.

The alarm unit 19 can have, for example, lamps or loudspeakers, to issue optical or audible warning signals as required.

The communication unit 20 can receive data via the external wireless connection, for instance via the internet 30, and forward this to the measuring device 40 via the internal network. Thus, the communication unit 20 can retrieve, for example, usage-related or location-related data and provide it to the device before use, so that this data is available at the usage site directly after the removal of the measuring device 40 from the case 10. Conversely, data of the measuring device 40 (e.g. distances or 3D coordinates recorded during a previous usage) can be transmitted via the internal wireless network to the communication unit 20 and forwarded from this to an external server over the internet 30.

According to the invention the communication unit 20 is able to retrieve such data over the wireless network, by means of which at least a rough localization of the case 10 is possible.

As a result, it is possible, for example, to determine whether the case 10 is approaching a previously defined usage site of the measuring device 40, and a predicted time of arrival at the usage site can be estimated or calculated. Based on this, the communication unit 20 can, for example, issue a command to the temperature regulating unit 18, to warm up the measuring device 40 to an optimal operating temperature, or to turn on the device or transfer usage- or location-related data to the device.

In addition, the communication unit 20 can retrieve license data of the device from the measuring device 40 itself or from an external server via the internet 30, which shows in which countries or regions the transported device is allowed to be used ("geofencing"). Based on the retrieved localization data, the communication unit 20 can identify whether the measuring device 40 may be used at the current location. If this is not the case, the communication unit 20 can, for example, issue a command to the locking unit to prevent opening by a user, and a command to the alarm unit 19 to trigger an alarm upon an opening attempt, or else inform the user of the reasons for the inability to open the case 10.

Alternatively, the communication unit 20 can, for example, send a command to the measuring device 40 not to function until an unlocking code is entered. The unlocking code can also be entered on the case, in order to be able to open it. Alternatively, information about the removal of the device 40 can be sent automatically by the communication unit 20 to the external server, which then automatically collects a fee from a user account.

Preferably, the case 10 has means for detecting the measuring device and/or its accessories located in the interior space. These means can be or comprise, for example, RFID readers. A completeness check can thus also be advantageously performed fully automatically. For example, prior to a surveying assignment it is possible to check with this whether all the required parts are present, or after completion of the assignment, whether all parts were stowed in the correct case again. In addition, in the case of a dispatch from the factory a final contactless inspection can take place, as to whether the delivery package is correct.

The central recording of the inventory and its whereabouts and condition is an important benefit, especially for fleet management of rental companies and larger service providers or construction companies. This information can also be used for a simplified billing procedure ("pay per use").

Preferably, means of displaying information (not shown here) are attached to the outer shell of the protective case 10. These may comprise, for example, a touch-screen or a power-saving e-paper display. The information displayed thereon can relate, in particular, to the contents of the case or to condition parameters or configurations of the devices or accessories that it contains. In addition, a charging state of a battery of the case and/or the measuring device, or other information about the hirer and owner, order ID, return date or similar can be displayed.

Likewise, a human-machine interface can preferably be provided which can be designed, for example, as a touch screen. This interface can be mounted both on the outer shell as well as in the interior space.

Diagnostic information—for example, data recorded by environmental sensors or information about an operating time of the measuring device—can be sent to a central server and thus promote a centrally optimized maintenance and repair planning operation. Remote diagnosis and/or maintenance of the measuring device are also possible.

Optionally, a plurality of cases 10 can communicate with each other. Such a system of protective cases can be used, for example, to check automatically whether all the devices needed for a surveying assignment are on board before departure, or after completion of the surveying assignment whether all devices used are reloaded, without the need to open the case. For example, one of the cases can serve as a master, whose communication unit is provided—for example over the wireless network—with a list of the parts to be transported and which then compares this list with the individual completeness and identity checks of the cases and communicates the result—e.g., again via the wireless network—to a user.

Figure 5:
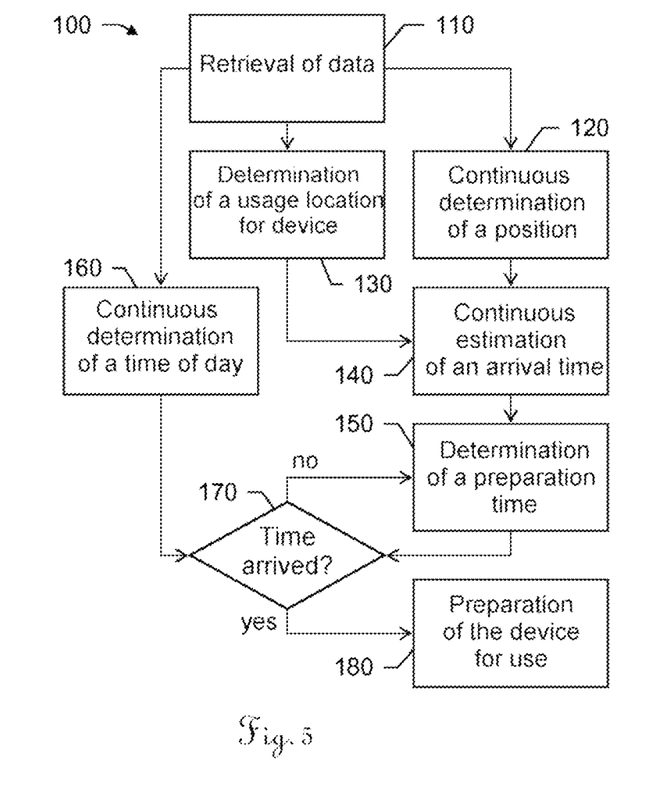
FIG. 5 a flow chart for illustrating a method for automatic preparation for use of a measuring device being transported by the protective case.

FIG. 5 shows a flow diagram to illustrate an exemplary embodiment of a method 100 for preparing a measuring device for use at a known location during transport of the measuring device 40 in an interior space 12 of a case 10.

In accordance with the method 100 illustrated, data are retrieved via a wireless network 110, which provide, inter alia, a rough localizability of the measuring device and/or of the case (localization data).

Alternatively, these data can also be accessible via a GNSS receiver module. Based on the retrieved data at least a rough position is continuously determined 120. In addition, a usage location of the measuring device is determined 130, for example also from the retrieved data or by a user entry. Based on the identified position and the known usage location, the time remaining until arrival at the usage location is estimated 140. Depending on a known required preparation time, a time is determined 150 at which the preparation of the device is to be started. At the same time, (e.g. from the retrieved data) a current time of day can be continuously calculated 160. If it is detected 170 that the time to prepare the device has arrived, the measuring device is prepared for its use 180, in particular fully automatically. As described above, for example, the measuring device can be switched on, and usage- or location-related data can be transmitted to the measuring device. Alternatively or additionally, the preparation can include charging a rechargeable battery of the measuring device or approximating or matching the temperature in the interior space of the case to a known optimal operating temperature of the measuring device.

Figure 6:
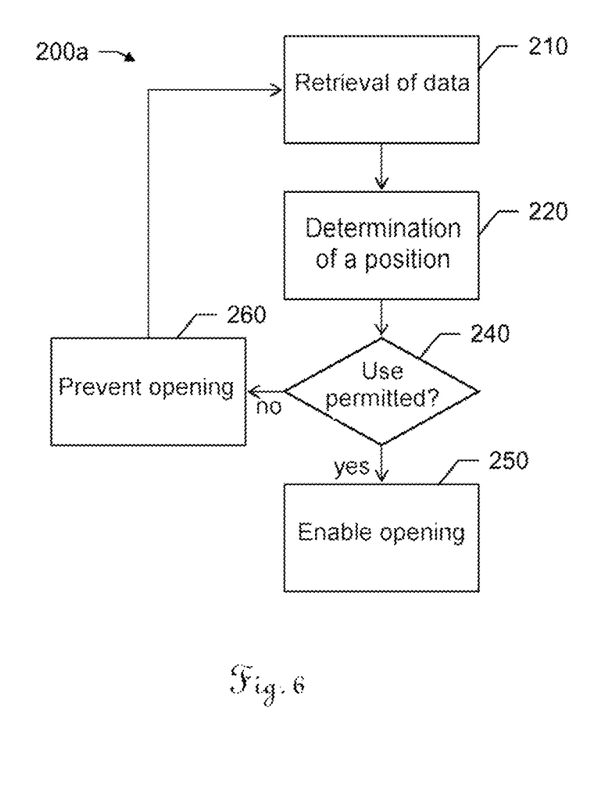
FIG. 6 a flowchart for illustrating a method for location-dependent prevention of the removal of the transported measuring device.
Figure 7:
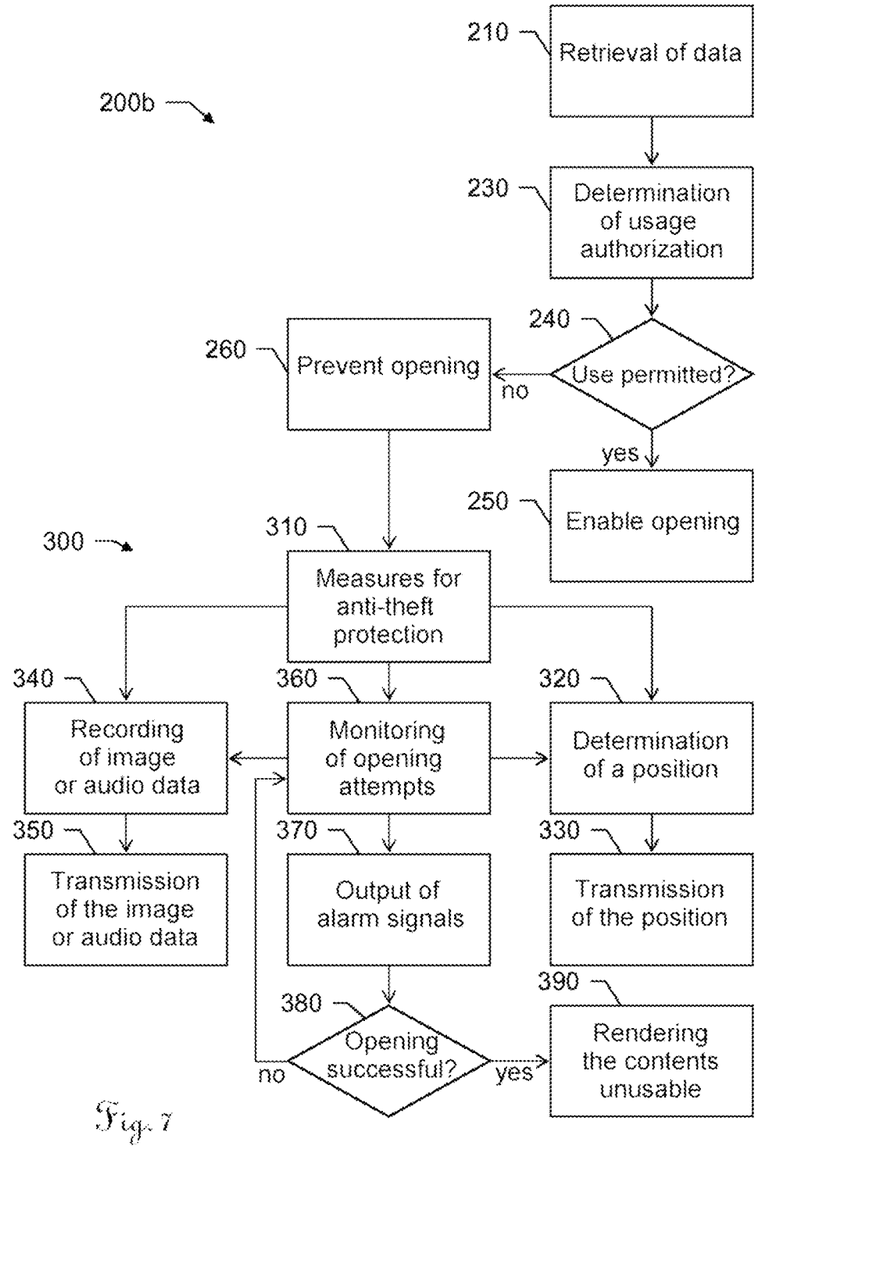
FIG. 7 a flowchart for illustrating a method for protecting the transported measuring device against theft.

FIGS. 6 and 7 each show a flowchart to illustrate two embodiments of a method 200 for preventing an unauthorized removal of a measuring device from a protective case.

In FIG. 6, a first embodiment 200a is illustrated. According to this embodiment of the method, data are retrieved via a wireless network 210, which provide, inter alia, a rough localizability of the measuring device and/or of the case. Based on the retrieved data at least a rough position is continuously determined 220. As already explained above, it is then determined 240 based on the data whether or not a user authorization exists for the measuring device located in the protective case at the present location, i.e. whether the use is permitted.

If this is the case, the user is allowed to open the case and thus to remove the measuring device 250. If this is not the case, on the other hand, the opening is prevented 260.

In FIG. 7, a second embodiment 200b is illustrated. In addition to the first embodiment this has an anti-theft protection functionality 300. According to this embodiment of the method, data are retrieved 210 via a wireless network. Based on these data it can be determined 230 whether or not the user currently has authorization to use the measuring device, in other words, for example, whether the equipment is being used legally or has been reported stolen. Based on the data it is determined 240 whether or not the user has authorization to use the measuring device located in the case at the present time, i.e. whether its use is permitted. If this is the case, the user is allowed to open the case and thus to remove the measuring device 250.

If this is not the case, on the other hand the opening is prevented 260. In addition, as part of the anti-theft protection functionality 300, further measures 310 are automatically taken. These measures may include, for example, the determination 320 of a position and the transmission of this position over the wireless network to an external server. A recording 340 of audio and image data 350 can also be performed to identify the illegitimate owner, followed by the transmission of this audio and image data over the wireless network to the external server. These measures may be carried out both continuously and immediately after a theft has been detected. On the other hand, monitoring 360 for opening attempts can be carried out, which triggers these measures. A detected opening attempt can also trigger an alarm 370, as already described above. In particular, if it is detected 380 that a successful opening attempt has been made, or is imminent, then the content or substantial parts of the measuring device can also be destroyed or rendered unusable 390—for example, mechanically, thermally or electrically. Alternatively, the equipment can be marked as stolen, for example with an eye-catching color. Also, a command can be transmitted to the device by the communication unit to lapse into a theft or locked mode, in which essential functions of the measuring device are out of service. To make the device operational again, an unlocking code may then be necessary, for example.

It goes without saying that these figures shown only represent possible exemplary embodiments in a schematic way. The different approaches can also be combined equally well with each other as with methods and devices from the prior art.

What is claimed is:

1. A portable protective case for transporting an electrical measuring device, the portable protective case comprising:
   an outer shell with internal cladding which encloses an interior space configured to accommodate the electrical measuring device, wherein the interior space has at least one mounting configured to accommodate a specific type of measuring device with known dimensions;
   a handle configured to enable the protective case to be carried by a user;
   a locking mechanism configured to enable the protective case to be opened by the user;
   a communication unit integrated into the protective case;
   a power supply unit having at least one accumulator for supplying power to the communication unit; and
   a verification means for verifying a presence and an identity of the electrical measuring device in the interior space, wherein the communication unit is configured to:
   retrieve data about the presence and identity of the electrical measuring device,
   retrieve and send data via an external wireless network,
   receive localization data that provides at least an approximate position of the protective case, and
   create a movement profile, based on a plurality of derived positions of the protective case.

2. The portable protective case as claimed in claim 1, wherein the interior is filled with a carrier material and the at least one mounting is a recess in the carrier material with a shape corresponding to the electrical measuring device.

3. The portable protective case as claimed in claim 1, wherein:
   the at least one mounting is configured for accommodating components of the electrical measuring device when the electrical measuring device is disassembled, or
   the at least one mounting is designed for accommodating a spare part or accessory of the electrical measuring device.

4. The portable protective case as claimed in claim 1, wherein the communication unit is configured to exchange data with the electrical measuring device.

5. The portable protective case as claimed in claim 1, wherein the verification means comprise at least one camera, a proximity sensor, a barcode scanner or an RFID reader.

6. The portable protective case as claimed in claim 1, wherein:
   the verification means comprise means for generating a wireless data network in the interior space, and
   the communication unit is configured to exchange data with the measuring device via the wireless data network.

7. The portable protective case as claimed in claim 1, further comprising:
   a display unit for displaying information concerning the electrical measuring device located inside the interior space on the outer shell.

8. The portable protective case as claimed in claim 1, wherein the power supply unit is configured to additionally supply power to the electrical measuring device in the interior space.

9. The portable protective case as claimed in claim 1, wherein the communication unit is designed to set up a connection to the internet and to retrieve and send data over the Internet.

10. The portable protective case as claimed in claim 1, wherein the communication unit is further configured to:
    maintain a connection to the at least one electrical measuring device, which is not located in the interior space of the protective case,
    maintain a connection to a communication unit of at least one other protective case, and
    establish a connection to a means of transport that accommodates the protective case.

11. The portable protective case as claimed in claim 1, wherein the communication unit is configured to retrieve the localization data via the wireless network.

12. The portable protective case as claimed in claim 1, wherein a GNSS receiver unit for determining the position of the case by means of a global satellite navigation system, wherein the communication unit is designed to receive the localization data from the GNSS receiver unit.

13. The portable protective case as claimed in claim 1, wherein the position of the protective case is determined to an accuracy of at least three hundred meters.

14. A portable protective case for transporting an electrical measuring device, the portable protective case comprising:
- an outer shell with internal cladding which encloses an interior space configured to accommodate the electrical measuring device, wherein the interior space has at least one mounting configured to accommodate a specific type of measuring device with known dimensions;
- a handle configured to enable the protective case to be carried by a user;
- a locking mechanism configured to enable the protective case to be opened by the user;
- a communication unit integrated into the protective case;
- a power supply unit having at least one accumulator for supplying power to the communication unit; and
- a verification means for verifying a presence and an identity of the electrical measuring device in the interior space, wherein the communication unit is configured to:
- retrieve data about the presence and identity of the electrical measuring device,
- retrieve and send data via an external wireless network,
- receive localization data that provides at least an approximate position of the protective case, and
- wherein the electrical measuring device has a known usage location, wherein the communication unit is configured to calculate a time remaining until arrival of the protective case at the usage location based on the identified position of the protective case and the known usage location of the measuring device from which the usage location can be determined.

15. The portable protective case as claimed in claim 14, wherein the communication unit is configured to exchange data with the electrical measuring device and based on a calculated time remaining, to automatically switch on the electrical measuring device and to transmit usage location-related data to the measuring device.

16. A system comprising:
- a calculation unit, and
- at least one protective case for transporting an electrical measuring device, the portable protective case comprising:
  - an outer shell with internal cladding which encloses an interior space configured to accommodate the electrical measuring device, wherein the interior space has at least one mounting configured to accommodate a specific type of measuring device with known dimensions;
  - a handle configured to enable the protective case to be carried by a user;
  - a locking mechanism configured to enable the protective case to be opened by the user;
  - a communication unit integrated into the protective case;
  - a power supply unit having at least one accumulator for supplying power to the communication unit; and
  - a verification means for verifying a presence and an identity of the electrical measuring device in the interior space, wherein the communication unit is configured to:
  - retrieve data about the presence and identity of the electrical measuring device,
  - retrieve and send data via an external wireless network, and
  - receive localization data that provides at least an approximate position of the protective case, and
  - create a movement profile, based on a plurality of derived positions of the protective case,
  - wherein the communication unit of the protective case and a computing unit are configured to exchange data via the wireless network, wherein the computing unit is designed to create the localization data and supply them to the communication unit.

17. The system of claim 16, comprising at least two protective cases, wherein the communication units are each configured to establish a connection to and exchange data with other communication units of other protective cases, which contain information about measuring devices located in the interior space of the protective cases.

18. A method for preparing a measuring device during transportation of the measuring device in an interior space of a case for use at a known location, the case including an outer shell with internal cladding which encloses an interior space configured to accommodate the electrical measuring device, wherein the interior space has at least one mounting configured to accommodate a specific type of measuring device with known dimensions, a handle configured to enable the protective case to be carried by a user, a locking mechanism configured to enable the protective case to be opened by the user, a communication unit integrated into the protective case, a power supply unit having at least one accumulator for supplying power to the communication unit, and a verification means for verifying a presence and an identity of the electrical measuring device in the interior space, the method comprising:
- retrieving localization data providing at least a general localizability;
- calculating, based on the localization data, of a rough position of the measuring device; and
- calculating, based on the identified position and the known usage location, of a time remaining until arrival at the usage location.

19. The method as claimed in claim 18, wherein based on the calculated time remaining:
- the measuring device is switched on; and
- a rechargeable battery of the measuring device is charged.

* * * * *